Dec. 12, 1939. O. BOCHMANN Re. 21,290
SPINNING CENTRIFUGE
Original Filed Nov. 2, 1931
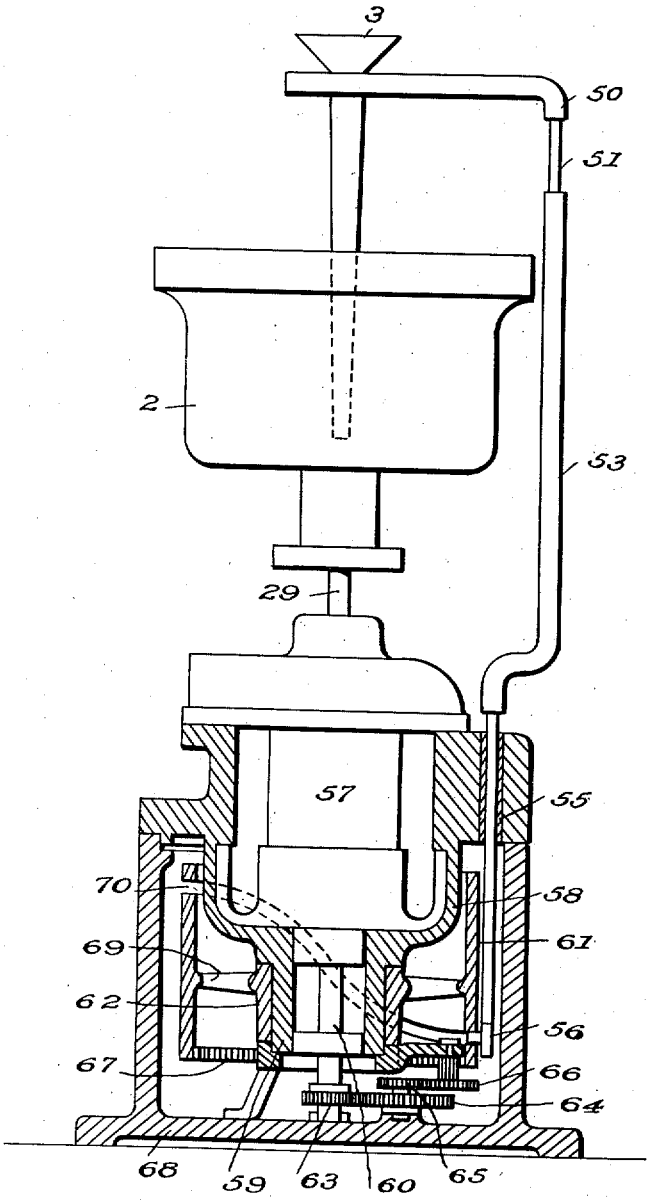
Inventor
OTTO BOCHMANN
By Thomas H. Byron
Attorney Reissued Dec. 12, 1939 Re. 21,290

UNITED STATES PATENT OFFICE 21,290

SPINNING CENTRIFUGE

Otto Bochmann, Remscheid-Lennep, Germany, assignor to American Bemberg Corporation, New York, N. Y., a corporation of Delaware Original No. 1,992,602, dated February 26, 1935, Serial No. 572,699, November 2, 1931. Application for reissue December 11, 1936, Serial No. 115,447. In Germany November 3, 1930

5 Claims. (Cl. 57—77)

In the manufacture of artificial silk it is necessary to impart to the filament guiding tube an upward and downward motion. These tubes are fixed to bars and have an upward and downward motion imparted to them by a cam drive through the intermediary of a common rocking shaft. As the motion is imparted from a main drive to a number of filament guiding tubes the transmission gear is complicated. A further disadvantage is that in the case of a breakdown the whole of the series having a common drive is put out of action.

These drawbacks are voided by effecting the drive of the thread guide funnel directly from the driving motor of the spinning pot by means of a curvilinear drive.

According to the invention the curvilinear guide for the up and down motion of the thread guide funnel is arranged concentrically with respect to the shaft of the driving motor for the spinning pot and driving the said guide by the motor shaft, if necessary through the intermediary of a transmission drive.

In order now to prevent the structural height of the spinning centrifuge from being too great it has been found to be particularly advantageous to make the curvilinear guide in the form of a hollow drum, the interior diameter of which is greater than the diameter of the motor housing and which projects wholly or partially over the said motor housing. By using this design of apparatus it is possible to maintain the structural heights which are now usual in centrifuges which have no drive for the thread guide funnel and it is also unnecessary to increase the periphery of the said centrifuge.

The drive of the drum provided with a curvilinear guide is effected by the lower end of the motor shaft which engages through a transmission drive with an internal gear provided on the said drum and thus the high speed of revolution of the motor shaft is converted into the requisite small rotational speed for actuating the thread guide funnel.

The drum with the curvilinear guide is mounted concentrically to the motor shaft on a cylindrical guide member arranged on the motor housing.

The thread guide funnel is held by a rod parallel to the centrifuge shaft and mounted axially displaceable in the housing. The rod engages at its lower end with the curve guide by means of a pin or a roller rotatable about a pin. The upper end of the rod is bent over at an angle and extends to over the middle of the spinning pot and is attached to the thread guide funnel by means of a holding device, e. g., a socket clamp.

Since the diameter of the spinning pot corresponds to that of the housing of the centrifuge or exceeds the same it is advisable to form a right angle bend in the rod which is provided for actuating the funnel through a right angle close to the spinning pot.

The accompanying drawing shows one constructional form of a spinning centrifuge according to the invention, by way of example, in sectional elevation.

The centrifuge consists of an electric motor 57 the shaft 29 of which supports a spinning pot 2 at its upper end. The electric motor is surrounded by a housing 58 which at its lower end is provided with a bushing 59 concentric to the motor shaft in the form of an appendage. A drum 61 provided with curved guide is mounted on this bushing 59. The drum 61 is suuported by spokes 69 which are integral with a hub 62, which hub 62 rotates about the bushing 59.

The driving of the guide drum is effected by the downwardly extending end 60 of the motor shaft 29 through a transmission gearing which consists of a number of toothed wheels 63—66 which engage in the internal gear 67 arranged in the lower end of the guide drum. In the peripheral surface of the guide drum a recurrent curve 70 is incised for providing the up and down movement of the thread guide funnel 3. A rod 50, 51, 53 engages in the curved guide by means of a pin 56. The rod consists of a lower portion 53 which is mounted parallel to the axis of the centrifuge in a bore 55 of the motor housing 58 so as to be axially displaceable therein. Above the point at which the rod leaves the housing the said part 53 is outwardly bent over through right angles. In the upper hollow end of the portion 53 another rod 51 is axially guided. This rod 51 supports an arm 50 projecting through a right angle over the spinning pot, which holes the thread guide funnel 3 by means of a clamping sleeve. The guide drum and the transmission gearing, as well as the lower portion of the guiding rod, are enclosed by a protecting casing 68 arranged on the motor housing.

What I claim is:

1. In an apparatus of the class described, a motor, a housing therefor, a shaft driven by said motor, a spinning pot on said shaft, means to guide thread to said pot, means to drive said guide means, said driving means comprising a hollow drum provided with a cam track arranged concentrically to said housing, said drug being rotatably secured to said housing, a gear on the other end of said shaft, said gear meshing with an intermediate gearing, said intermediate gearing in turn rotating said drum, and means driven by said drum and connected to said thread guide means for imparting reciprocatory motion to the latter upon rotation.

2. In an apparatus of the class described, a motor, a shaft driven by said motor, a spinning pot on said shaft, means to guide thread to said pot, means to impart reciprocatory motion to said guide, said reciprocatory means comprising a hollow drum concentric to said shaft, said drum being provided with a cam track, a follower riding in said cam track and directly concentric with said thread guide means, and means operatively connecting said drum cam and said motor, means for mounting said cam on said motor whereby said cam may be driven thereby.

3. In a machine for manufacturing thread, a revolvable bucket, means for guiding thread into the bucket, and annular means diagonally arranged about the bucket axis for operating said thread guiding means.

4. In a machine for manufacturing thread, a revolvable bucket, means for guiding thread into the bucket, and annular means diagonally arranged about the bucket axis for operating said thread guiding means, said last mentioned means comprising a circular cam.

5. In a machine for manufacturing thread, a revolvable bucket, means for guiding thread into the bucket, and a cylindrical cam for operating said thread guiding means, said cam rotating about the bucket axis.

OTTO BOCHMANN.